(12) United States Patent
Kakarala et al.

(10) Patent No.: US 7,088,392 B2
(45) Date of Patent: *Aug. 8, 2006

(54) DIGITAL IMAGE SYSTEM AND METHOD FOR IMPLEMENTING AN ADAPTIVE DEMOSAICING METHOD

(76) Inventors: Ramakrishna Kakarala, 1055 E. Evelyn #B-9, Sunnyvale, CA (US) 94086; Izhak Baharav, 2548 Saint Lawrence Dr., San Jose, CA (US) 95124

( * ) Notice: Subject to any disclaimer, the term of this patent is extended or adjusted under 35 U.S.C. 154(b) by 724 days.

This patent is subject to a terminal disclaimer.

(21) Appl. No.: 09/940,825

(22) Filed: Aug. 27, 2001

(65) Prior Publication Data

US 2003/0052981 A1    Mar. 20, 2003

(51) Int. Cl.
*H04N 5/335* (2006.01)

(52) U.S. Cl. ............... 348/272; 382/167; 348/252; 348/222.1

(58) Field of Classification Search ........ 348/273, 348/272, 280, 246, 245, 222.1; 382/266, 382/300, 274, 162, 169, 199, 269
See application file for complete search history.

(56) References Cited

U.S. PATENT DOCUMENTS

| | | | | |
|---|---|---|---|---|
| 4,630,307 A | * | 12/1986 | Cok | 382/165 |
| 5,008,739 A | * | 4/1991 | D'Luna et al. | 348/246 |
| 5,365,604 A | * | 11/1994 | Kwok et al. | 382/275 |
| 5,652,621 A | | 7/1997 | Adams, Jr. et al. | 348/272 |
| 5,751,361 A | * | 5/1998 | Kim | 375/240.12 |
| 5,808,674 A | | 9/1998 | Adams, Jr. et al. | |
| 5,832,143 A | * | 11/1998 | Suga et al. | 382/300 |
| 6,034,724 A | | 3/2000 | Nakamura | |
| 6,075,889 A | * | 6/2000 | Hamilton et al. | 382/167 |
| 6,091,862 A | | 7/2000 | Okisu | |
| 6,229,578 B1 | | 5/2001 | Acharya et al. | |
| 6,289,137 B1 | * | 9/2001 | Sugiyama et al. | 382/299 |
| 6,404,918 B1 | * | 6/2002 | Hel-or et al. | 382/167 |

(Continued)

FOREIGN PATENT DOCUMENTS

| | | |
|---|---|---|
| EP | 1 111 904 | 6/2001 |
| JP | 11 215515 | 8/1999 |
| JP | 11 275373 | 10/1999 |
| WO | WO 99/39509 | 8/1999 |

OTHER PUBLICATIONS

Shinohara et al, Color Image Analysis in a Vector Field, Sep. 14-17, 1993, Electrical and Computer Engineering, pp. 23-26.*

Bernd Jähne; *Computer Vision and Applications*; pp. 333-335.

(Continued)

*Primary Examiner*—Tuan Ho
*Assistant Examiner*—Nelson D. Hernandez

(57) ABSTRACT

An adaptive demosaicing method interpolates images based on color edge detection and neighborhood voting. The adaptive demosaicing algorithm uses a voting scheme to determine the direction of interpolation at each missing luminance pixel location. Each color plane votes either horizontal or vertical based on a comparison between the horizontal and vertical components of the degree of change (i.e., gradient, Laplacian or other measure of the degree of change) in that color plane. Votes are counted from the neighborhood pixels as well as from measurements taken at the pixel location itself. Once the luminance plane is fully interpolated, the chrominance planes are filled in by simple bilinear or median interpolation of difference chrominance values. Enhancements to the adaptive demosaicing algorithm permit adaptive smoothing and sharpening.

33 Claims, 7 Drawing Sheets

U.S. PATENT DOCUMENTS

| | | | |
|---|---|---|---|
| 6,507,364 B1 * | 1/2003 | Bishay et al. | 348/242 |
| 6,528,181 B1 | 3/2003 | Yamane et al. | |
| 6,563,537 B1 * | 5/2003 | Kawamura et al. | 348/252 |
| 6,567,192 B1 * | 5/2003 | Toyomura et al. | 358/497 |
| 6,570,616 B1 * | 5/2003 | Chen | 348/272 |
| 6,781,626 B1 * | 8/2004 | Wang | 348/273 |
| 6,791,609 B1 * | 9/2004 | Yamauchi et al. | 348/273 |
| 6,803,965 B1 * | 10/2004 | Takegoshi et al. | 348/500 |
| 6,819,363 B1 * | 11/2004 | Moro et al. | 348/540 |
| 6,924,839 B1 * | 8/2005 | Eiho et al. | 348/252 |
| 6,933,970 B1 * | 8/2005 | Koshiba et al. | 348/273 |
| 2001/0005429 A1 * | 6/2001 | Ishiga et al. | 382/167 |
| 2002/0001409 A1 * | 1/2002 | Chen et al. | 382/167 |
| 2002/0130957 A1 * | 9/2002 | Gallagher et al. | 348/222 |
| 2003/0052981 A1 * | 3/2003 | Kakarala et al. | 348/272 |

OTHER PUBLICATIONS

James E. Adams, Jr.; *Design of Practical Color Filter Array Interpolation Algorithms for Digital Cameras, Part 2*; IEEE 1998; pp. 488-492.

Nicos Herodotou and Anastasios N. Venetsanopoulos; *Colour Image Interpolation for High Resolution Acquisition and Display Devices*; IEEE 1995; pp. 1118-1126.

Tetsuya Kumo, Hiroaki Sugiura, Masako Asamura, Yoshiko Hatano and Narihiro Matoba; *Aliasing reduction method for color digital still cameras with a single-chip charge-coupled device*; Journal of Electronic Imaging, vol. 8(4); Oct. 1999; pp. 457-465.

Partial European Search Report dated Feb. 17, 2005.

European Search Report dated Oct. 25, 2005.

* cited by examiner

DIGITAL IMAGE SYSTEM AND METHOD FOR IMPLEMENTING AN ADAPTIVE DEMOSAICING METHOD

BACKGROUND OF THE INVENTION

1. Technical Field of the Invention

The present invention relates generally to digital image processing, and particularly to demosaicing methods for interpolating colors at each pixel location.

2. Description of Related Art

Digital color image sensors are predominately of two types: CCDs (Charge Coupled Devices) and CMOS—APS (Complimentary Metal Oxide Semiconductor—Active Pixel Sensors). Both types of sensors typically contain an array of photo-detectors (pixels), arranged in rows and columns, that sample color within an image. Each pixel measures the intensity of light within one or more ranges of wavelengths, corresponding to one or more colors.

In addition, both types of sensors may include a color filter array (CFA), such as the CFA described in U.S. Pat. No. 3,971,065 to Bayer (hereinafter referred to as Bayer), which is hereby incorporated by reference. With the Bayer CFA, each pixel sees only one color: red, green or blue. The sampling pattern is shown below.

```
G R G R G
B G B G B
G R G R G
```

A sensor fitted with a Bayer CFA produces a mosaiced image that is sampled in both the color space and in the spatial domain. The sampling process produces aliasing artifacts in both the color space and in the spatial domain. For example, since the full color spectrum is sampled only at certain pixel locations (depending on the CFA colors), it is impossible to accurately reconstruct the true color of an image, thereby producing color space aliasing artifacts. In addition, since high spatial frequencies in the original image are sampled at too low of a frequency, the original high frequencies in the image cannot be restored later on through image processing, thereby producing spatial domain aliasing artifacts.

One solution to the color space and spatial domain aliasing artifact problems is demosaicing. Demosaicing is the process of interpolating colors of a digital image obtained from an image sensor to obtain all three primary colors at a single pixel location. When viewed, the resulting demosaiced image provides a better quality and more visually pleasing image than the mosaiced image.

Previous demosaicing methods have included, for example, pixel replication, bilinear interpolation and median interpolation. In pixel replication, each missing value is taken from the neighbor to the left, above, or diagonally above and left, whichever is nearest. Bilinear interpolation offers some improvement over pixel replication with a moderate increase in complexity. In the bilinear interpolation method, each missing value is calculated based on an average of the neighboring pixel values, horizontally, vertically and/or diagonally. Median interpolation, which is a nonlinear interpolation method, offers the best results among these three algorithms (pixel replication, bilinear and median), especially when there are defective pixels, but has the maximum complexity. Median interpolation has two steps. First, missing values having four diagonal neighbors are interpolated using the median of those four values. Second, the remaining missing pixels are interpolated by the median of north, south, east, and west neighbors.

However, with all of the above demosaicing methods, noticeable aliasing artifacts appear at edges within the image, producing a "zipper" effect in the demosaiced image. The "zipper" effect makes a straight edge in the image appear as a zipper. Solutions to the "zipper" effect have been proposed in U.S. Pat. No. 5,652,621 to Adams, Jr. et al. (hereinafter referred to as the Adams-Hamilton algorithm) and Kuno et al., "Aliasing reduction method for color digital still cameras with a single-chip charge-coupled device," *Journal of Electronic Imaging,* Vol. 8, No. 4, October 1999, pp. 457–466 (hereinafter referred to as the Kuno algorithm), both of which are hereby incorporated by reference.

The Adams-Hamilton interpolation algorithm seeks to optimize the performance of image systems that sample images having horizontal and vertical edges. In the Adams-Hamilton interpolation algorithm, an interpolation method for interpolating a missing color value is selected. The interpolation direction is selected by calculating horizontal and vertical (or positive diagonal and negative diagonal) classifier values that are based on values taken from the color plane being interpolated and the color plane of the pixel location.

The two classifier values are compared with predefined thresholds and each other to select an interpolation method. For example, if one or more of the classifier values are greater than a predefined threshold, the missing color value is interpolated from both neighboring values of the same color as the missing color value and neighboring values of the color of the pixel location. The missing color value may be interpolated from horizontal neighboring values, vertical neighboring values or both horizontal and vertical neighboring values depending on which classifier values exceed the predefined threshold. The Adams-Hamilton algorithm does preserve detail and reduce the appearance of the "zipper" effect. However, with the Adams-Hamilton algorithm, some "zippering" is still visible.

The Kuno interpolation algorithm is based on the correlation of details assumption, expressed by Kodera et al. in "Method to display full-color image by using the correlation of color," *IIEEJ Annual Convention,* Vol. 16(2), pp. 86–88 (1988), which is hereby incorporated by reference. The correlation of details assumption presumes that in a local region of an image, there is a high correlation amongst the colors. For example, using an image sensor fitted with a Bayer CFA, the correlation of details assumption predicts that the red, blue and green color values within a local region of an image will be relatively similar (e.g., if the red value of a red pixel location is 10, the correlation of details assumption predicts that the neighboring green and blue pixel locations will produce respective green and blue color values near 10).

The Kuno algorithm further postulates that even in regions with sharp color changes, a color correlation exists in one direction (i.e., either horizontal or vertical). Therefore, the Kuno algorithm uses a vertical interpolation orientation where only a low correlation in color values exists in the horizontal direction, and a horizontal interpolation orientation where only a low correlation in color values exists in the vertical direction. Specifically, the Kuno algorithm computes the horizontal and vertical gradients of the color plane associated with the missing color value and compares the horizontal and vertical gradients to a predefined threshold to determine the direction of interpolation. For example, if both the horizontal and vertical gradients are less than the predefined threshold, interpolation is performed both horizontally and vertically. However, if either of the gradients is greater than the predefined threshold, the direction of interpolation is in the smaller of the two gradients.

Once the direction of interpolation is determined, the Kuno algorithm uses a division operation to interpolate the missing color value. As with the Adams-Hamilton algorithm, the Kuno algorithm does reduce the "zipper" effect and improve color resolution as compared with previous demosaicing methods, such as pixel replication, bilinear interpolation and median interpolation. However, with the Kuno algorithm, some "zippering" is still visible. In addition, the Kuno algorithm requires a division operation to be carried out at every pixel location, which is expensive to implement. Therefore, what is needed is a demosaicing algorithm that further reduces the visibility of the "zipper" effect, as compared with the Adams-Hamilton algorithm and Kuno algorithm, and that can be implemented without the hardware complexity necessitated by the Kuno algorithm.

SUMMARY OF THE INVENTION

In the course of the present invention, an analysis was conducted of the reasons for the appearance of the "zipper effect" in images demosaiced using the Adams-Hamilton algorithm and Kuno algorithm. As a result of the analysis, a determination was made that the "zipper effect" was still visible in images demosaiced using the Adams-Hamilton algorithm and Kuno algorithm because neither algorithm separately considered the gradient in at least two of the color planes and neither algorithm applied the decisions made at neighboring pixels when interpolating a given pixel.

The present invention provides an adaptive demosaicing method that interpolates each pixel location by separately considering the degree of change (e.g., the gradient, the Laplacian or other measure of the degree of change) in both the horizontal and vertical directions in at least two of the color planes. The adaptive demosaicing algorithm uses a voting scheme to determine the direction of interpolation at each pixel location. Each color plane votes either horizontal or vertical based on a comparison between the vertical and horizontal components of the degree of change in that color plane. In some embodiments, votes are counted from the neighborhood pixels as well as from measurements taken at the pixel location itself In one embodiment, the direction of interpolation is applied only to the luminance color plane. Once the luminance plane is fully interpolated, the chrominance planes are filled in by a simple bilinear or median interpolation of difference chrominance values. Enhancements to the adaptive demosaicing algorithm permit adaptive smoothing and sharpening. For example the adaptive demosaicing algorithm is capable of adapting to low-light level (i.e., noisy) images, and reducing the imbalance between luminance pixels.

Since the adaptive demosaicing algorithm requires only additions, subtractions, shifts and comparisons, all of which are easy to implement in hardware, the adaptive demosaicing algorithm reduces the hardware complexity present in previous demosaicing methods. In addition, the adaptive demosaicing algorithm further reduces the appearance of the "zipper effect" in demosaiced images as compared with previous demosaicing methods. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
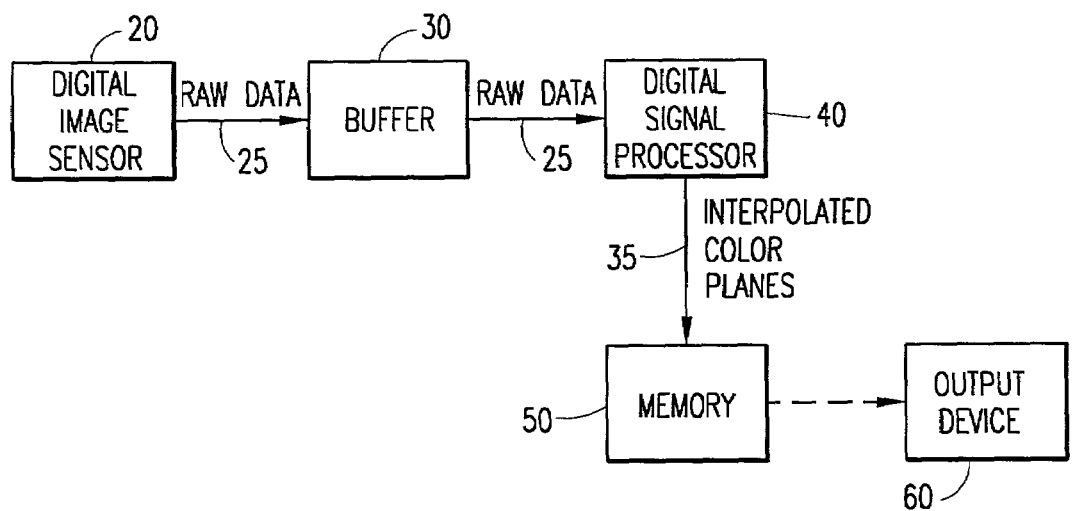
FIG. 1 is a block diagram illustrating a digital image system utilizing an adaptive demosaicing algorithm in accordance with exemplary embodiments of the present invention.

FIG. 1 shows a digital image system 10 implementing the adaptive demosaicing algorithm 40 in accordance with the present invention. The digital image system 10 can be any digital imaging device, such as a digital camera, video camera, medical imaging device, etc. The digital image system 10 can also be a computer system, such as a personal computer or server, having a memory therein for storing image data. Thus, the adaptive demosaicing algorithm 40 can be within a digital imaging device or a part of an image processing software running on a personal computer or server.

The digital image system 10 includes a digital image sensor 20, such as a CMOS sensor chip or a CCD sensor chip, which includes a two-dimensional array of pixels arranged in rows and columns. The digital image sensor may be covered by a color filter array (CFA), such that each pixel senses only one color. For example, the CFA may be the Bayer CFA described above, in which chrominance colors (red and blue) are interspersed amongst a checkerboard pattern of luminance colors (green). It should be understood that other CFA's may be used instead of the Bayer CFA described herein.

The digital image sensor 20 provides raw data 25 containing the original red, blue and green pixel values to a digital signal processor 40, which applies the adaptive demosaicing algorithm of the present invention to the raw data 25 in order to interpolate the pixel values to obtain red, green and blue values at each pixel location. The raw data 25 is provided to the digital signal processor 40 blocks at a time. Thus, the raw data 25 is stored in a buffer 30 until the requisite amount of raw data 25 is present to begin processing.

The number of raw data values 25 needed to begin processing depends on the type of processing. For example, the pixel values corresponding to the raw data 25 are typically read off the sensor 20 one row at a time. For a neighborhood interpolation of a given pixel to begin, at least one horizontal pixel neighbor, and preferably, one vertical pixel neighbor are stored within the buffer 30. In addition, since most digital cameras take multiple images to ensure the exposure is correct before selecting the image to permanently store, one or more images may be stored in the buffer 30 at a time.

The result of demosaicing is three interpolated color planes 35 (i.e., R, G and B), each containing the original values and the interpolated values. It should also be understood that other color spaces, such as yellow, cyan and magenta, can be used instead of the red, blue and green color space discussed herein. The interpolated red, green and blue color planes 35 are stored in a memory 50 until displayed or processed. It should be noted that the color planes 35 may be compressed using a compression method (not shown), such as the JPEG standard, prior to being stored in the memory 50. To display or process the compressed image on an output device 60 (e.g., a video screen, computer screen or printer), the compressed image is first decompressed, and the decompressed image is output to the output device 60.

Figure 2:
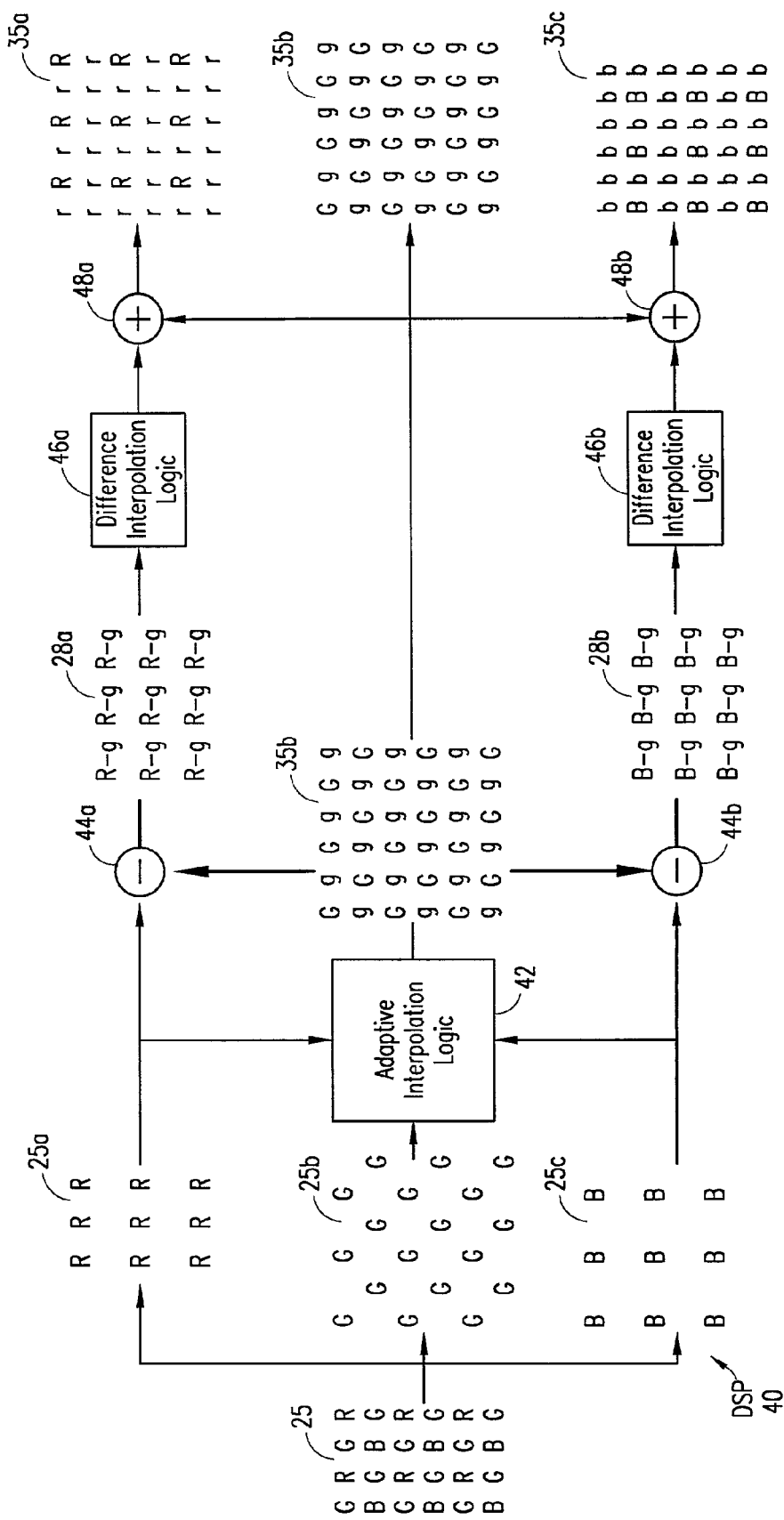
FIG. 2 is a block diagram illustrating the logic for implementing the demosaicing algorithm in accordance with exemplary embodiments of the present invention.

The digital signal processor 40 interpolates each image stored in the buffer 30 according to the adaptive demosaicing algorithm shown in FIG. 2. The adaptive demosaicing algorithm shown in FIG. 2 is referred to herein as the principal vector method (PVM). PVM is based on color edge detection and neighborhood voting. Within an image, there are many edges where the light intensity changes sharply. In order to produce a sharp output image, color interpolation should be directed along edges, rather than across them. Therefore, the PVM algorithm detects at every pixel location whether the pixel lies on an edge, and if so, estimates the orientation of that edge. It should be understood that the term "edge" herein refers to a pixel that lies on a boundary of an object or other boundary where the intensity changes sharply. The term "edge" does not refer to pixels that lie on one of the four natural boundaries of an image (i.e., pixels that lie on an edge of the sensor itself).

In one embodiment, both edge detection and edge orientation estimation may be attempted by using a single color plane, for example, green. However, relying on a single color plane may lead to errors in regions of the image where the color relied upon is not present, or alternatively, at colored edges where the color relied upon is fixed. In other embodiments, edge detection and edge orientation estimation may be pooled from two or three color planes. The pooling of results from all three color planes typically provides better results. Therefore, the PVM algorithm shown in FIG. 2 illustrates the pooling of edge-related information (e.g., edge detection and edge orientation estimation) from the three color planes.

When the raw data 25 arrives at the digital signal processor 40, the raw data 25 is separated into three raw data color planes 25a, 25b and 25c, each having missing elements. The digital signal processor 40 applies adaptive interpolation logic 42 to the luminance raw data color plane 25b (i.e., green) in order to determine the missing luminance values at each location. For example, the adaptive interpolation logic 42 interpolates the green value at each red or blue pixel, using either horizontal interpolation, vertical interpolation or a combination of horizontal and vertical interpolation, based on a voting mechanism, which will be described in more detail below with reference to FIGS. 4 and 5. The resulting interpolated green color plane 35b contains both the original green values, which are represented by the upper case G, and interpolated green values, which are represented by the lower case g.

Once the missing green values are determined, the missing red and blue values are interpolated. Initially, subtraction logic 44a and 44b computes the difference between the missing green value at each red or blue pixel location and the corresponding original red or blue pixel value. For example, taking the blue value B in the lower left-hand corner of the blue raw data color plane 25c, subtraction logic 44b subtracts the interpolated green value g in the lower left-hand corner of the interpolated green color plane 35b from the blue value B in the lower left-hand corner of the blue raw data color plane 25c.

The resulting difference color planes 28a and 28b are interpolated by difference interpolated logic 46a and 46b, respectively, using any known method, such as median interpolation, bilinear interpolation or pixel replication. FIG. 2 illustrates the bilinear interpolation method, in which the red and blue difference color planes 28a and 28b are input to bilinear difference interpolation logic 46a and 46b, respectively, to produce red and blue difference interpolated color planes (not shown). The final red and blue interpolated color planes 35a and 35c are obtained by inputting the red and blue difference interpolated color planes to addition logic 48a and 48b, respectively, which adds the values of the red and blue difference interpolated color planes to the green values g and G of the green interpolated color plane 35b for the corresponding pixel locations. It is these interpolated red, blue and green color planes 35a, 35b and 35c, respectively, that are output from the DSP 40 to the memory 50 (shown in FIG. 1).

Figure 3:
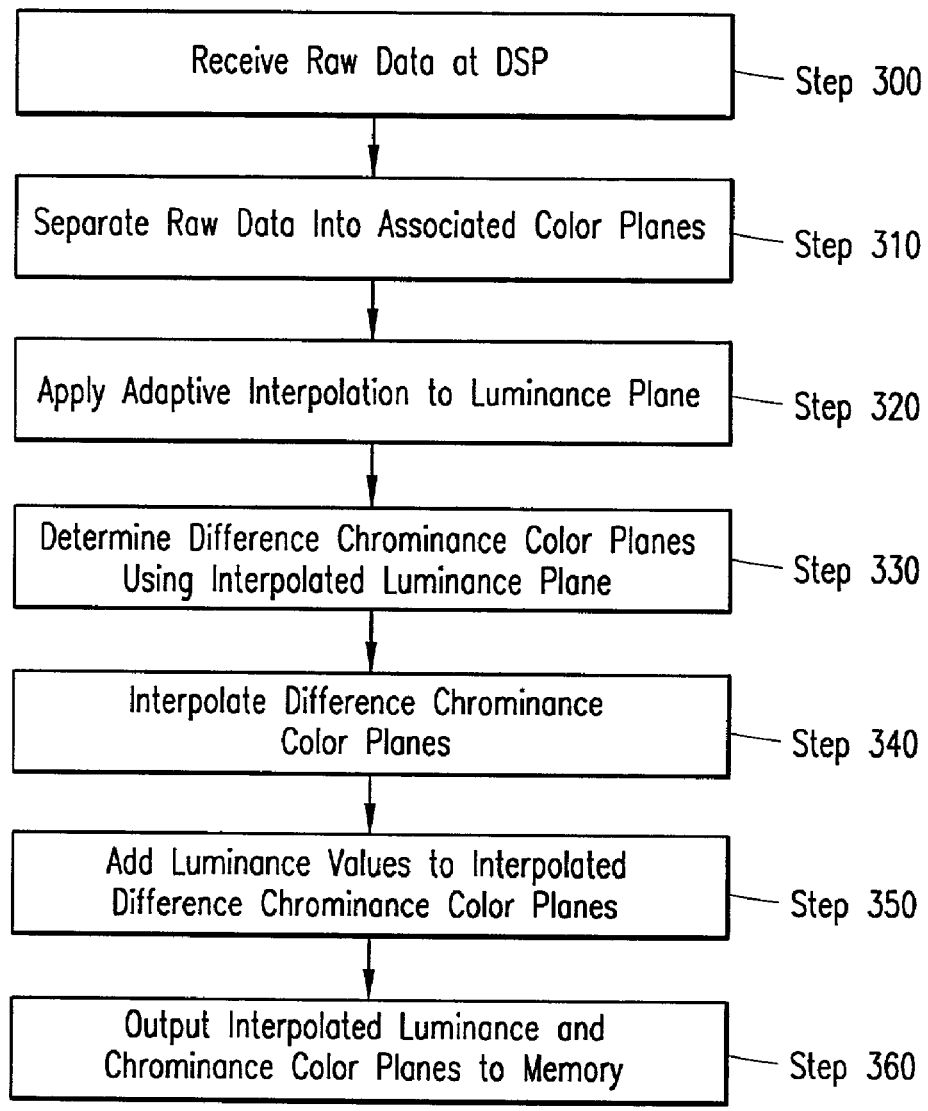
FIG. 3 is a flow chart illustrating the exemplary steps for performing the demosaicing algorithm illustrated in FIG. 2.

FIG. 3 shows the steps for performing the PVM demosaicing algorithm. Initially, the DSP receives the raw data (step 300) and separates the raw data (step 310) into the three raw data color planes. The DSP applies the adaptive interpolation technique (step 320) (described below in FIGS. 4 and 5) to the luminance color plane (i.e., green). Using the interpolated luminance color plane, the DSP determines the difference chrominance color planes (i.e., red and blue) by subtracting the interpolated luminance values from the corresponding pixel chrominance color values (step 330). For example, denoting the interpolated green plane as $\tilde{G}$, the missing red and blue values can be interpolated by first forming the differences at every red or blue pixel location as follows:

$$D_{RG}(x, y) = R(x, y) - \tilde{G}(x, y), \qquad \text{(Equation 1)}$$

$$D_{BG}(x, y) = R(x, y) - \tilde{G}(x, y), \qquad \text{(Equation 2)}$$

This gives two difference images, $D_{RG}$ and $D_{BG}$, whose values are respectively known only on the red or blue pixel locations.

Thereafter, the DSP interpolates the difference chrominance color planes using the difference chrominance values (step 340). As mentioned above, the difference chrominance color planes can be interpolated using any known method, such as median interpolation, bilinear interpolation or pixel replication.

The simplest form of chrominance interpolation is pixel replication. For example, in pixel replication, each missing value is taken from the neighbor to the left, above, or diagonally above and left, whichever is nearest. Since the human visual system has a lower acuity in the chrominance colors than in the luminance colors, pixel replication provides good results in most situations.

Bilinear interpolation offers some improvement over pixel replication with a moderate increase in complexity. In the bilinear interpolation method, the difference red or blue values are convolved with the following 3×3 filter:

$$\frac{1}{4}\begin{bmatrix} 1 & 2 & 1 \\ 2 & 4 & 2 \\ 1 & 2 & 1 \end{bmatrix}$$ (Equation 3)

It should be noted that in the above filter, the multiplications and divisions are by powers of two, and hence can be accomplished with shifts.

Median interpolation, which is a nonlinear interpolation method, offers the best results, especially when there are defective pixels, but has the maximum complexity. Median interpolation has two steps. First, missing values having four diagonal neighbors are interpolated using the median of those four values. Second, the remaining missing pixels are interpolated by the median of north, south, east, and west neighbors.

As an example, assume that in a neighborhood of pixel values, the difference image $D_{RG}$ has the following values:

$$\begin{bmatrix} 0 & 1 & 0 & -3 & 0 \\ 0 & 0 & 0 & 0 & 0 \\ 0 & -4 & 0 & 7 & 0 \\ 0 & 0 & 0 & 0 & 0 \\ 0 & 2 & 0 & 23 & 0 \end{bmatrix}$$

After the first step, the missing values having four diagonal neighbors are interpolated by the median of those neighbors. The result of the first step is:

$$\begin{bmatrix} 0 & 1 & 0 & -3 & 0 \\ * & 0 & -1 & 0 & * \\ 0 & -4 & 0 & 7 & 0 \\ * & 0 & 5 & 0 & * \\ 0 & 2 & 0 & 23 & 0 \end{bmatrix}$$

The locations marked * are also interpolated, but their values are not indicated because they depend on neighboring values lying outside of 5×5 region shown. The second step fills in the remaining missing values using the median of four north, south, east and west neighbors as follows:

$$\begin{bmatrix} * & 1 & * & -3 & * \\ * & * & -1 & * & * \\ * & -4 & 2 & 7 & * \\ * & * & 5 & * & * \\ * & 2 & * & 23 & * \end{bmatrix}$$

Once the interpolated difference images, denoted $\tilde{D}_{RG}$ and $\tilde{D}_{BG}$, are obtained, the final interpolated red and blue values can be determined by addition with the original and interpolated green values (step 350) as follows:

$$\tilde{R}(x, y) = \tilde{D}_{RG}(x, y) + G(x, y),$$ (Equation 4)

$$\tilde{B}(x, y) = \tilde{D}_{BG}(x, y) + G(x, y).$$ (Equation 5)

These interpolated luminance (green) and chrominance (red and blue) color planes are output to the memory (step 360).

Figure 4:
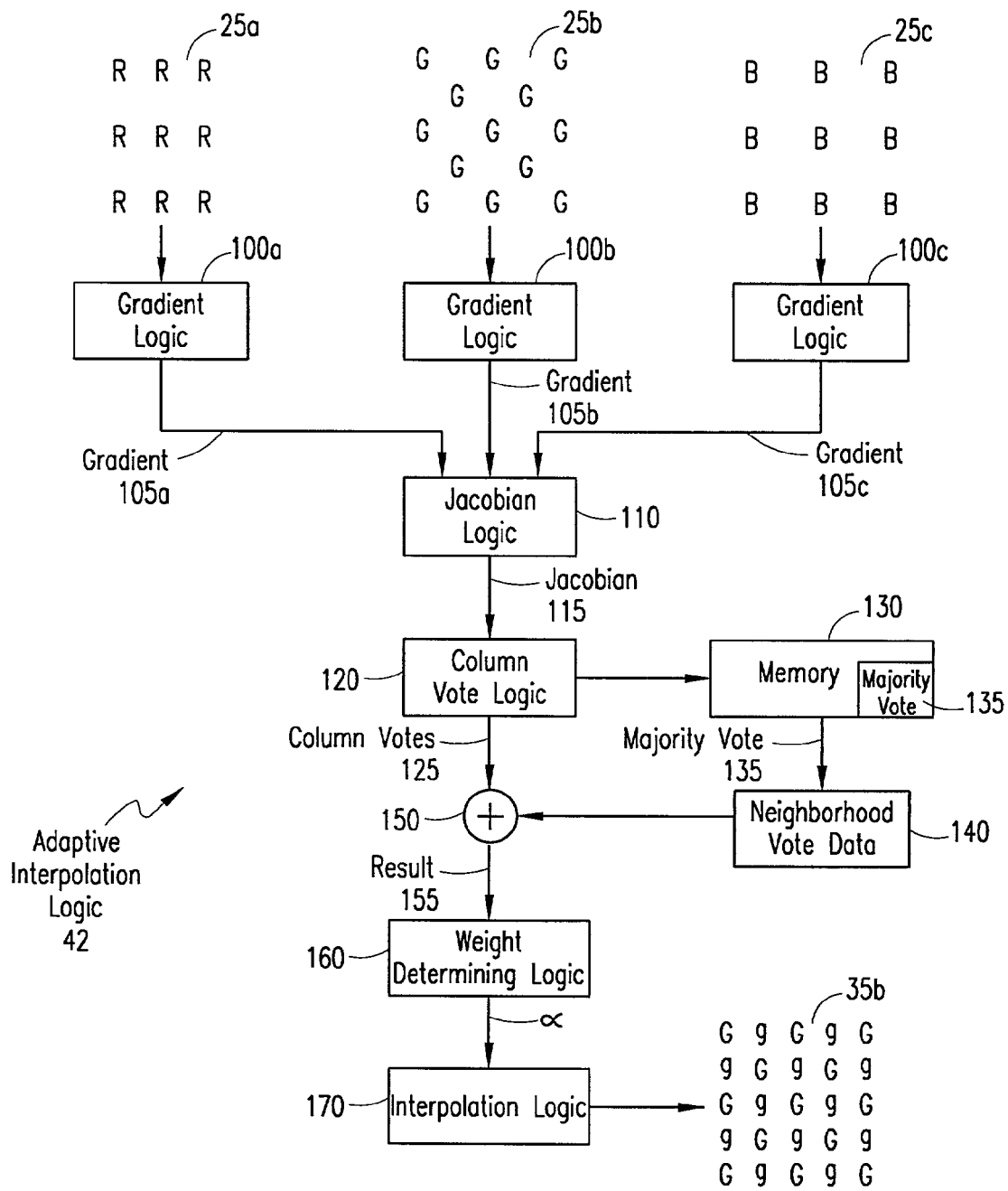
FIG. 4 is a block diagram illustrating the logic for implementing an exemplary adaptive interpolation of the luminance color plane in accordance with the demosaicing algorithm of the present invention.

The adaptive interpolation logic 42 will now be described in greater detail with reference to FIG. 4. When the raw data color planes 25a, 25b and 25c are received at the adaptive interpolation logic 42, respective gradient logic 100a, 100b and 100c determines the gradient 105a, 105b and 105c, respectively, of each of the color planes 25a, 25b and 25c, respectively, and Jacobian logic 110 determines the Jacobian 115 of the color planes 25a, 25b and 25c. The following is an explanation of the gradient 105a, 105b and 105c and Jacobian 115 of the color planes 25a, 25b and 25c.

Since a color image is a mapping from a 2-dimensional (2-D) domain to a 3-dimensional (3-D) space, i.e., the color space, each component of the color image may be viewed as a function defined on the (x, y) domain, i.e., (R(x, y), G(x, y), B(x, y). As described in B. Jahne and H. Haussecker, eds., *Computer vision and applications: a guide for students and practitioners,* San Diego: Academic Press, 2000, pp. 334–335, which is hereby incorporated by reference, a method for measuring the local orientation in color images starts by constructing the Jacobian (J) of the map from the 2-D plane to 3-D color space:

$$J = \begin{bmatrix} \frac{\partial R}{\partial x} & \frac{\partial G}{\partial x} & \frac{\partial B}{\partial x} \\ \frac{\partial R}{\partial y} & \frac{\partial G}{\partial y} & \frac{\partial B}{\partial y} \end{bmatrix} = [\nabla R \quad \nabla G \quad \nabla B],$$ (Equation 6)

where $\nabla$ denotes the gradient (i.e., the direction of steepest increase). The Jacobian captures the local first-order variation of the color image in the horizontal (x) and vertical (y) directions.

For example, assume the following raw data is supplied to the adaptive interpolation logic 42:

$$\begin{matrix} B_1 & G_{y1} & B_2 \\ G_{x1} & R_1 & G_{x2} \\ B_3 & G_{y2} & B_4 \end{matrix}$$

To determine the green gradient of pixel location $R_1$, the horizontal green derivative and vertical green derivative of pixel $R_1$ must be calculated. The horizontal green derivative would be $(G_{x1} - G_{x2})$, and the vertical green derivative would be $(G_{y1} - G_{y2})$. The red gradients and blue gradients at pixel location $R_1$ are calculated in a similar manner. For example, the blue horizontal blue derivative would be $((B_1+B_3)/2-(B_2+B_4)/2)$, and the vertical blue derivative would be $((B_1+B_2)/2-(B_3+B_4)/2)$. The red derivatives would be calculated using horizontal and vertical red values that are not shown above.

The singular vale decomposition (SVD) of the Jacobian may be written as:

$$J = USV^t = s_1 u_1 v_1^t + s_2 u_2 v_2^t. \qquad \text{(Equation 7)}$$

Here $s_1 \geq s_2 \geq 0$ are the singular values, and $u_k$, $v_k$ are respectively, the left and right k-th singular vectors. It is well known in the art that the best rank one approximation (in the sense of minimizing the sum of squared errors) to J is:

$$J \approx s_1 u_1 v_1^t. \qquad \text{(Equation 8)}$$

Since the vector $u_1$ provides the direction of largest variation for the color image, the vector $u_1$ is the principal vector of the Jacobian, or simply the "principal vector."

The SVD of the Jacobian provides useful information about the edge structure of a color image. As shown in Equation 6, each of the three columns of J is the gradient in one of the R, G, B color planes. In the case that the gradients are parallel to one another, the edge can be said to be consistent in the three planes. In that case, the principal vector points in the same direction as the gradients, and the smaller singular value, $s_2$, equals 0. In the case when the R, G, B gradients are not parallel, the "principal vector" provides the best "fit" to the three gradients. The degree to which the "principal vector" fits the gradients may be determined from the singular values. For example, the degree of fit may be measured by:

$$\lambda = \frac{s_2}{s_1 + s_2}. \qquad \text{(Equation 9)}$$

Since $s_1 \geq s_2$ and $0 \leq \lambda \leq \frac{1}{2}$, when $\lambda=0$, the "principal vector" provides a perfect (because the gradients are all parallel), whereas if $\lambda=\frac{1}{2}$, the fit is poorest. An example of a situation when $\lambda=\frac{1}{2}$ occurs is when two of the three gradients point in orthogonal directions, and the third gradient is zero.

As mentioned above, the "principal vector" $u_1$ points in the direction of greatest change. However, adaptive demosaicing using the PVM algorithm actually interpolates from neighbors in the direction of least change to minimize the risk of blurring edges. Therefore, the vector $u_2$, which is orthogonal to $u_1$ and points in the direction of least change, is used as the interpolation direction. For example, assume that $I_1$ is the result of interpolating along $u_1$, and $I_2$ is the result of interpolating along $u_2$. Then, the total interpolation, denoted I, is a weighted combination of $I_1$ and $I_2$, where the weighting is based on the measure of fit $\lambda$ as follows:

$$I = \lambda I_1 + (1-\lambda) I_2 \qquad \text{(Equation 10)}$$

This weighting guarantees that the total interpolation varies continuously between $I_2$ (when $\lambda=0$, and therefore the principal vector perfectly fits the gradients) and $I=(I_1+I_2)/2$ (when $\lambda=\frac{1}{2}$, and the fit is poorest).

In order to compute $I_1$ and $I_2$ from the raw data 25a, 25b and 25c, which is rectangularly sampled, let $I_h$ and $I_v$, respectively, denote the interpolants in the horizontal and vertical directions. $I_h$ and $I_v$ may be computed by forming simple linear combinations of pixel values along rows (for $I_h$) or, alternatively, along columns (for $I_v$). Next, let $u^1 = [u_1(1), u_1(2)]^t$ and $u_2 = [u_2(1), u_2(2)]^t$, and note that both $u_1$ and $u_2$ are unit-length vectors. Then, $$I_1 = u_1(1)^2 I_h + u_1(2)^2 I_v, \text{ and} \qquad \text{(Equation 11)}$$

$$I_2 = u_2(1)^2 I_h + u_2(2)^2 I_v. \qquad \text{(Equation 12)}$$

By combining Equations 11 and 12 with Equation 10, I now becomes $$I = \alpha I_h + (1-\alpha) I_v, \text{ with } \alpha = \lambda u_1(1)^2 + (1-\lambda) u_2(1)^2. \qquad \text{(Equation 13)}$$

As can be seen, computing the value of I in Equation 13 requires three terms: $I_h$, $I_v$, and $\alpha$. The first two terms, $I_h$ and $I_v$, are straightforward to compute, since they involve only simple linear combinations of pixel values. However, the third term, $\alpha$, is based on terms that are extracted from the SVD of J. Potentially, this requires computation of the SVD of J at every pixel, which is prohibitive.

However, in one embodiment, to simplify the computation, approximate values for $\alpha$ can be estimated. For example, in order to simplify the computation of $\alpha$, the adaptive interpolation logic 42 can assume that the value of $\alpha$ can be quantized to three levels: $\alpha=0$, 1, and $\frac{1}{2}$. This means that the total interpolation I of Equation 13 is either purely horizontal, purely vertical, or an average of the two. The adaptive interpolation logic 42 can also assume that the direction of the principal vector $u_1$ can be quantized to be one of only two possibilities: horizontal or vertical. Thus, if the inclination of $u_1$ from the horizontal axis is less than ±45, $u_1$ is horizontal, and otherwise $u_1$ is vertical. Equivalently, $u_1$ is horizontal if $|u_1(1)| \geq |u_1(2)|$, and vertical otherwise.

The adaptive interpolation logic 42 can further assume that the decision whether the principal vector is horizontal or vertical can be made by applying a majority rule. The majority rule is as follows: if the majority of elements of the bottom row of the Jacobian 115 (which are vertical derivatives) exceed in absolute value the corresponding elements of the top row of the Jacobian 115 (which are horizontal derivatives), the principal vector is vertical. Otherwise, the principal vector is horizontal. For example, if the Jacobian 115 is $$J = \begin{bmatrix} 1 & 3 & -2 \\ 3 & 1 & 1 \end{bmatrix},$$

two of the elements of the top row exceed their counterparts in the bottom row in absolute value. Thus, the principal vector for the above Jacobian 115 is assumed to be horizontal.

Although the majority rule provides the direction of the principal vector, the majority rule does not by itself determine $\alpha$ among the possibilities $\{0, \frac{1}{2}, 1\}$. As discussed before, the "principal vector" itself is not used as the interpolation direction. Rather, the interpolation direction is orthogonal to the direction of the "principal vector." Therefore, when selecting the weighting factor $\alpha$, the adaptive interpolation logic 42 considers the actual number of horizontal derivatives exceeding vertical derivatives (or vice-versa).

For example, if all of the horizontal derivatives exceed their counterpart vertical derivatives, $\alpha$ is set to 0 to force vertical interpolation (which is the direction orthogonal to the principal vector). Vertical interpolation is preferred for pixels that lie on a vertical edge within an image. Since there is a sharp change in intensity at horizontally adjacent pixels, interpolating horizontally for pixels that lie on a vertical edge will not provide an adequate interpolated value. The above technique for selecting the weighting factor $\alpha$ detects that a pixel is on a vertical edge because the first-order derivative for a vertical edge pixel is higher in the horizontal direction than in the vertical direction. If the weighting factor α corresponds to the pixel lying on a vertical edge, vertical interpolation is applied.

However, if none of the horizontal derivatives exceed their counterpart vertical derivatives, α is set to 1 to force horizontal interpolation. Horizontal interpolation is preferred for pixels that lie on a horizontal edge within an image for the same reasons as discussed above in connection with vertical edge pixels. However, if only one or two of the horizontal derivatives exceed their counterpart vertical derivatives, α would be set to ½ to include both horizontal and vertical interpolation since the principal vector fit is poorest where the gradients are not parallel. The fit is usually poorest when a pixel does not lie on an edge, and therefore, both horizontal and vertical interpolation are preferred.

As shown in FIG. 2, the selection mechanism for α described above is implemented by column vote logic 120 within the adaptive interpolation logic 42. The column vote logic 120 takes each column of the Jacobian 115 for a particular pixel, and assigns each column one vote. A column votes horizontal if the bottom value exceeds the top value, and votes vertical if the top value exceeds the bottom value. Thus, three column votes 125 are collected at each pixel.

This voting scheme may be further extended to accommodate neighborhood pixel votes as well as votes at each pixel. Thus, before determining the weighting factor α, the adaptive interpolation logic 42 can consider neighborhood vote data 140 in addition to the column votes 125. For example, at two neighboring pixels, if two or more columns of the Jacobian 115 of each neighboring pixel voted horizontal, the neighborhood vote data 140 would include two horizontal votes. It should be noted that although this extended voting scheme does not use the individual Jacobian 115 column votes at neighboring pixels, and only considers the result of the majority rule, in other embodiments, the extended voting scheme may include each column vote at neighboring pixels as well.

The neighborhood vote data 140 may be defined to be data from any subset of pixels preceding the current pixel in a raster scan of the image. For example, the neighborhood vote data 140 can include data from the adjacent pixels to the left and above the current pixel. This neighborhood is referred to as the neighborhood of distance one. However, it should be understood that other neighborhoods of different distances may also be chosen.

When the column vote logic 110 has determined the vote for each column of a particular pixel, the column vote logic 110 determines the majority vote 135 (i.e., either vertical or horizontal), and stores the majority vote 135 in a memory 130 (which could be the same memory 50 as shown in FIG. 1). For example, if the majority vote 135 is horizontal (i.e., two or more of the columns voted horizontal), the column vote logic 110 can store a "1" in memory 130 for that pixel. If the majority vote 135 is vertical, the column vote logic 110 can store a "0" in memory 130 for that pixel. Therefore, when the adaptive interpolation logic 42 interpolates the raw data 25a, 25b and 25c, the outcome of the majority rule on a number of previous lines corresponding to the distance of the neighborhood N is stored in the memory 130. Advantageously, the memory requirement is only 1 bit per pixel for each line that is stored.

Once all of the column votes 125 from the column vote logic 110 and the neighborhood vote data 140, which includes one or more majority votes 135, are collected, addition logic 150 adds the column votes 125 for the current pixel supplied by the column vote logic 110 to the neighborhood votes supplied by the neighborhood vote data 140. The result 155 of the addition of votes is passed to weight determining logic 160 to assign the weighting factor α. As an example, the votes may divided into three ranges. First, if the number of horizontal votes is less than a first threshold $T_1$, α=0. Second, if the number of horizontal votes is between the first threshold $T_1$ and a second threshold $T_2$, α=0.5. Third, if the number of horizontal votes is greater than the second threshold $T_2$, α=1.

The choice of $T_1$ and $T_2$ depends on the size of the neighborhood N. For example, if N has a distance of one, then in one embodiment $T_1=1$ and $T_2=4$. Thus, for a neighborhood with a distance of one, the maximum number of votes is five (i.e., three for the current pixel and one for each of the adjacent pixels). With $T_1$ and $T_2$ so chosen, if one or fewer votes for horizontal interpolation are received, then vertical interpolation is chosen with α=0. If either 4 or 5 votes for horizontal interpolation are obtained, then horizontal interpolation is chosen with α=1. In the middle ground where 2 or 3 votes are obtained, averaging of horizontal and vertical interpolation is applied with α=0.5. It should be understood that other thresholds may be used if a different neighborhood N is chosen. Once the weighting factor α is determined, interpolation logic 170 uses α to interpolate the missing green values, and output the interpolated green color plane 35b.

Figure 5:
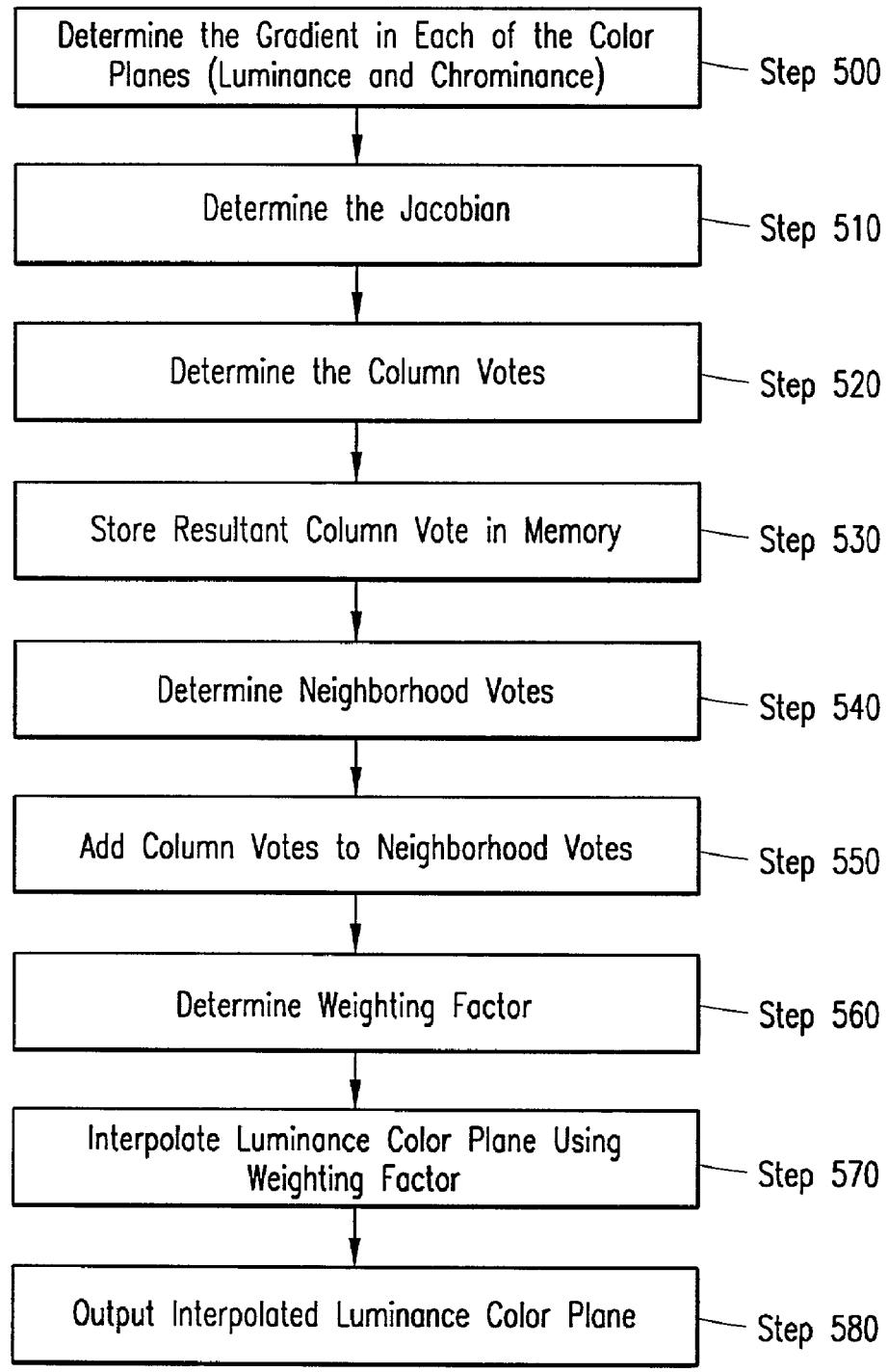
FIG. 5 is a flow chart illustrating the exemplary steps for performing the adaptive interpolation process shown in FIG. 4.

Referring now to FIG. 5, the steps for interpolating the luminance color plane (i.e., determining the missing green values at the chrominance pixel locations) are illustrated. As a first step, the gradient in each of the raw data chrominance color planes (i.e., red and blue) is estimated by taking the first-order derivative in the horizontal and vertical directions (step 500). It should be noted that other measures of the degree of change, such as the second-order derivatives, can be used instead of the first-order derivatives described herein.

Once the gradients at each pixel location are estimated, the Jacobian for each pixel location is known (step 510), as shown in Equation 6. Each column of Jacobian (i.e., each gradient) votes either horizontal or vertical (step 520). Each of the gradients (columns) supplies a respective vote, and the majority vote (i.e., either vertical or horizontal depending on which had the most votes) is stored in the memory (step 530).

Typically, the DSP processes the raw data row by row. Therefore, although the raw data for the adjacent pixels to the right and below the pixel location currently being processed may be known, the majority vote for these adjacent pixels is not yet known. So, typically when considering neighborhood votes (step 540), the only adjacent pixels that have completed voting and stored the majority vote in the memory are the adjacent pixels to the left and above the pixel location currently being processed. For example, again considering the pixel location $R_1$ of the following Bayer pattern $$B_1 \quad G_{y1} \quad B_2$$
$$G_{x1} \quad R_1 \quad G_{x2},$$
$$B_3 \quad G_{y2} \quad B_4$$

the neighborhood vote data would include the majority vote from $G_{x1}$ and $G_{y1}$. It should be understood that the number of neighborhood votes can be increased to consider neighbors two or more pixels away from the currently processed pixel.

For the neighborhood of distance one, the majority vote from each of the adjacent pixels to the left and above the pixel location currently being processed are added to the column votes for the currently processed pixel location, resulting in five total votes (step 550). The weighting factor α is determined based on the total number of horizontal votes verses the total number of vertical votes, as described above (step 560). For example, again considering the pixel location $R_1$ above, if the red gradient (column) voted horizontal, the blue gradient (column) voted vertical and the green gradient (column) voted horizontal, the majority vote of the pixel location $R_1$ is horizontal. In addition, if the majority vote from the pixel location G was horizontal and the majority vote for the pixel location $G_{y1}$ was vertical, the total number of horizontal votes is 3 and the total number of vertical votes is 2.

As discussed above, one or more thresholds based on either the total number of horizontal votes or the total number of vertical votes can be set to determine the weighting factor α. In the example described above in connection with FIG. 4, two thresholds, $T_1$ and $T_2$, were set based on the total number of horizontal votes. In the example of FIG. 4, $T_1=1$ and $T_2=4$. So, using the total number of votes from the pixel location $R_1$ discussed above, the weighting factor α would be 0.5, since there were 3 horizontal votes. Therefore, the interpolation of the missing green value at pixel location $R_1$ would be based on both the horizontal and vertical pixel values.

Interpolation results are usually improved by applying a linear prediction. For a smooth function f(x), the linear prediction is $$f(x) \approx f(x_o) + (x-x_o)f'(x_o) \quad \text{(Equation 14)}$$

For example, expanding the line including $R_1$ in the Bayer pattern above, the following pixels are in the horizontal neighborhood:

$$R_2 G_{x1} R_1 G_{x2} R_3.$$

The linear prediction of the green value at $R_1$ from $G_{x1}$ is, using the difference approximation $f'(x_o)=(R_1-R_2)/2$, and setting $x-x_o=1$:

$$G_{x1} + \frac{R_1 - R_2}{2}. \quad \text{(Equation 15)}$$

This mixing of colors is based on an assumption of the strong local correlation between color planes, so that differences in the same direction should be similar.

Similarly, the linear prediction at $R_1$ from $G_{x2}$ is, with $x-x_o=-1$:

$$G_{x2} - \frac{R_3 - R_1}{2} \quad \text{(Equation 16)}$$

Hence, the horizontally interpolated green value at $R_1$, denoted $I_h$ in Equation 13, is the average of results in Equations 15 and 16:

$$I_h = \frac{G_{x1} + G_{x2}}{2} + (-R_2 + 2R_1 - R_3)/4. \quad \text{(Equation 17)}$$

In low-light level imaging situations, noise prevents the linear prediction from being useful. Whether or not an image is a low-light image is typically determined by looking at the pixel values. Pixel values usually range from 0–255. For example, if the majority of pixel values are below a low-light threshold, which can be determined by the operator or programmed into the digital imaging system, the image is considered to be a low-light image. Hence, it is advantageous to scale the linear interpolant by a factor γ, where $0 \leq \gamma \leq 1$, which may be set according to the gains applied to the input pixels. Specifically, Equation 17 can be rewritten as:

$$I_h = \frac{G_{x1} + G_{x2}}{2} + \gamma(-R_2 + 2R_1 - R_3)/4. \quad \text{(Equation 18)}$$

For low-light levels, the gains are high, and consequently so is the noise, and γ would be equal to 0 or to a small positive value. For normally lit scenes, γ would be equal to 1.

A similar interpolation as shown in Equation 18 is used for horizontal interpolation for lines with blue and green, and also for vertical interpolation. To compute the interpolated luminance value at the pixel location $R_1$, as described above, the average of horizontal and vertical interpolations are used.

Once the missing luminance values have been interpolated (step 570), the interpolated luminance color plane is output (step 580) by the adaptive interpolation logic shown in FIG. 2 to be used in interpolating the chrominance color planes, using any known demosaicing technique, as described above in connection with FIG. 2. By using the adaptive demosaicing PVM algorithm, images realize a reduction in isolated interpolation errors. Therefore, using a neighborhood provides smoother reconstruction of an image than previous demosaicing methods.

Figure 6A:
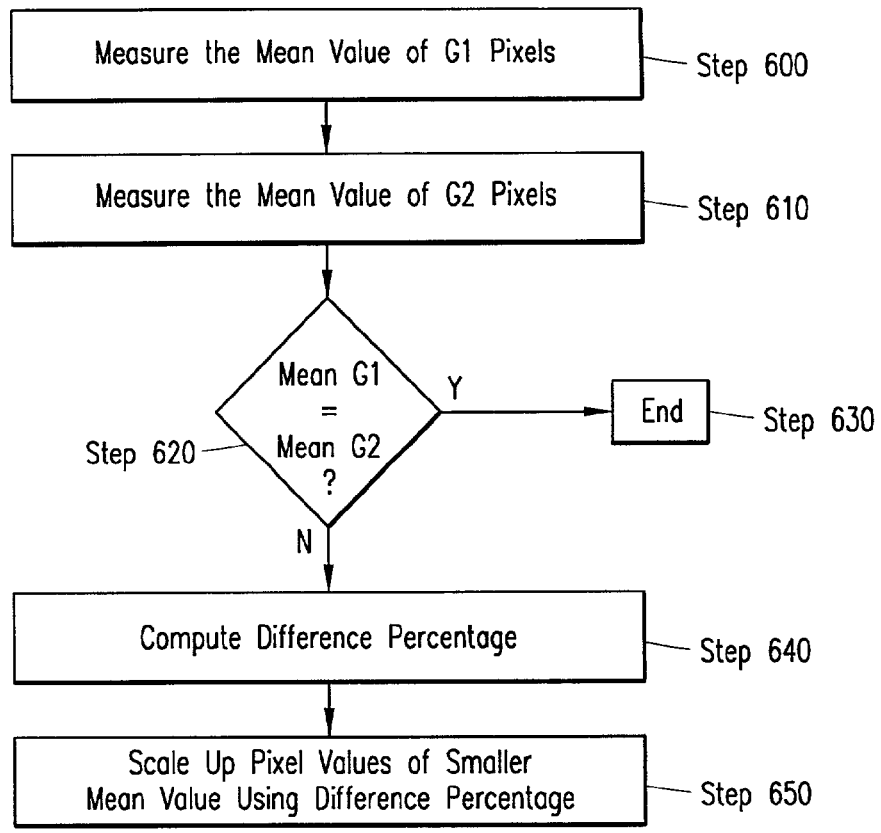
FIG. 6 is a flow chart illustrating the exemplary steps of an enhancement to the demosaicing algorithm of the present invention that compensates for color mismatch in an image.

The performance of PVM may be further improved by additional processing steps. One type of enhancement to the PVM demosaicing algorithm is shown in FIG. 6A. FIG. 6A illustrates the exemplary steps for compensating for G1:G2 mismatch. The green pixels within the raw data 25 shown in FIG. 2 fall into two categories: (1) those with red pixels as horizontal neighbors and blue pixels as vertical neighbors, called "G1:pixels; and (2) those with the blue pixels as horizontal neighbors and red pixels as vertical neighbors, called "G2" pixels. The G1 pixels often exhibit significantly different values from the G2 pixels to the same illumination, due to factors including sensor architecture and CFA misalignment. The variation in green values is most noticeable in image regions where green is uniform, and appears as a checkerboard pattern when examined closely.

The mismatch between G1 and G2 pixels may be corrected using two pre-processing steps applied prior to the PVM demosaicing algorithm. The first step, which is shown in FIG. 6A and referred to as the "mean balancing" step, is a global correction. The mean balancing step proceeds by measuring the mean value of the G1 pixels of the entire image (step 600) and, separately, the mean value of the G2 pixels of the entire image (step 610). If the two mean values are equal (step 620), no mismatch exists and processing is completed (step 630). However, if the two mean values are not equal (step 620), a difference percentage between the two mean values is determined (step 640). Thereafter, the green pixel values of the smaller of the two means (G1 mean or G2 mean) are scaled up using the difference percentage (step 650).

This mean balancing step may be applied prior to demosaicing using the PVM algorithm. As discussed above, digital cameras often take multiple images to ensure the exposure is correct before selecting the image to permanently store. Therefore, this mean balancing step may be performed on one of the images taken prior to the stored image.

Figure 6B:
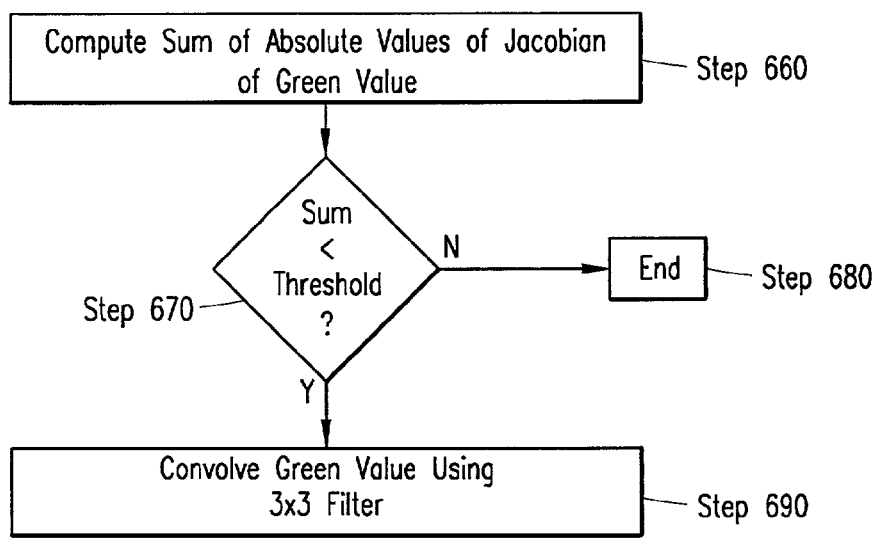

The second step is shown in FIG. 6B and referred to as "adaptive smoothing". This second step may also be performed prior to interpolation of the green color plane, and preferably after the "mean balancing" step. The adaptive smoothing step applies a smoothing filter to the raw green values at pixels that do not lie on edges, and uses the smoothed green values for interpolation. Whether a pixel lies on an edge may be determined by computing the sum of the absolute values of entries from the Jacobian matrix shown in Equation 6 (step 660). If the sum of the absolute values of entries in the Jacobian is less than a predefined threshold (step 670) (i.e., in experimental tests, a threshold of 64 was used), the pixel does not lie on an edge, and hence smoothing may be applied to the raw green value. If the sum is not less than the predefined threshold (step 670), the pixel does lie on an edge and processing ends with respect to this pixel (step 680). It should be noted that for the adaptive smoothing step, the green column of the Jacobian of a green pixel value is computed by taking differences of similar green pixels, i.e., G1 values with G1 values, G2 values with G2 values, but not G1 values with G2 values.

Once it is determined that the green pixel does not lie on an edge (step 670), smoothing may be accomplished by convolving the green value with a 3×3 filter (step 690) as follows:

$$\frac{1}{8}\begin{bmatrix} 1 & 0 & 1 \\ 0 & 4 & 0 \\ 1 & 0 & 1 \end{bmatrix}.$$ (Equation 19)

The above filter in Equation 19 assumes a Bayer pattern similar to the following:

$$\begin{matrix} G_1 & R & G_1 \\ B & G_2 & B \\ G_1 & R & G_1 \end{matrix}$$

Here a G2 value is surrounded by four G1 values. To smooth the G2 value, the G2 value is multiplied by four and added to each of the surrounding G1 values. The total after addition is then divided by eight. The resulting value is used as the G2 value.

Figure 7:
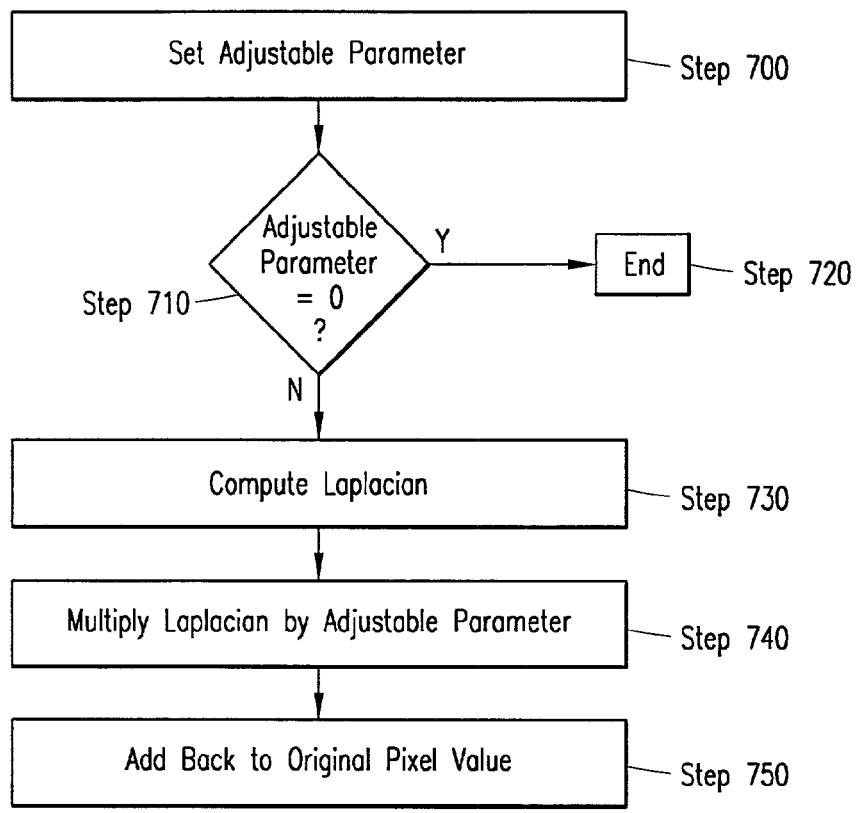
FIG. 7 is a flow chart illustrating the exemplary steps of an enhancement to the demosaicing algorithm of the present invention that sharpens an image.

A further enhancement to the PVM demosaicing technique is shown in FIG. 7. FIG. 7 illustrates the steps for sharpening an image. Since an image is sampled only at pixel locations, there is an inherent under-sampling of an image, which may lead to the elimination of some high-frequencies in the image. Therefore, in order to sharpen an image, the second derivative is added back to the original image. For example, assume the following Bayer pattern:

$$\begin{matrix} G11 & R12 & G13 & R14 & G15 \\ B21 & G22 & B23 & G24 & B25 \\ G31 & R32 & G33 & R34 & G35 \\ B41 & G42 & B43 & G44 & B45 \\ G51 & R52 & G53 & R54 & G55 \end{matrix}$$

The second order horizontal derivative of G33 can be estimated by: (2G33-G31-G35). Similarly, the second order vertical derivative of G33 can be estimated by: (2G33-G53-G13).

Preferably, the amount of sharpening is adjustable based on the user's preferences. For example, if $\nabla^2$ denotes the Laplacian, and $\kappa$ is an adjustable parameter, with $0 \leq \kappa \leq 1$, the sharpened image $\hat{I}(x, y)$ can be obtained from the original image $I(x, y)$ by the following equation:

$$\hat{I}(x, y) = I(x, y) + \kappa \nabla^2 I(x, y).$$ (Equation 20)

Here, I is any of the fully-populated color planes, red, green, or blue, that are obtained after demosaicing.

As a first step, the user sets the adjustable parameter $\kappa$ (step 700). The adjustable parameter $\kappa$ is set to 0 when no sharpening is desired and 1 when the maximum amount of sharpening is desired. However, it should be understood that any value between 0 and 1 may be used for $\kappa$. If the adjustable parameter $\kappa$ is set to 0 (step 710), no sharpening is performed (step 720). If the adjustable parameter $\kappa$ is not set to 0 (step 710), the Laplacian is determined (step 730), multiplied by the adjustable parameter $\kappa$ (step 740) and added back to the original pixel value (step 750).

In one embodiment, sharpening can be applied to the interpolated green image prior to difference image interpolation. For example, if $\tilde{G}(x, y)$ is the interpolated green plane, then the sharpened green plane $\hat{G}(x, y)$ is as follows:

$$\hat{G}(x, y) = \tilde{G}(x, y) + \kappa \nabla^2 \tilde{G}(x, y).$$ (Equation 21)

By replacing $\tilde{G}(x, y)$ in Equations 1 and 2 with $\hat{G}(x, y)$, sharpening can be achieved with minimal processing.

Figure 8:
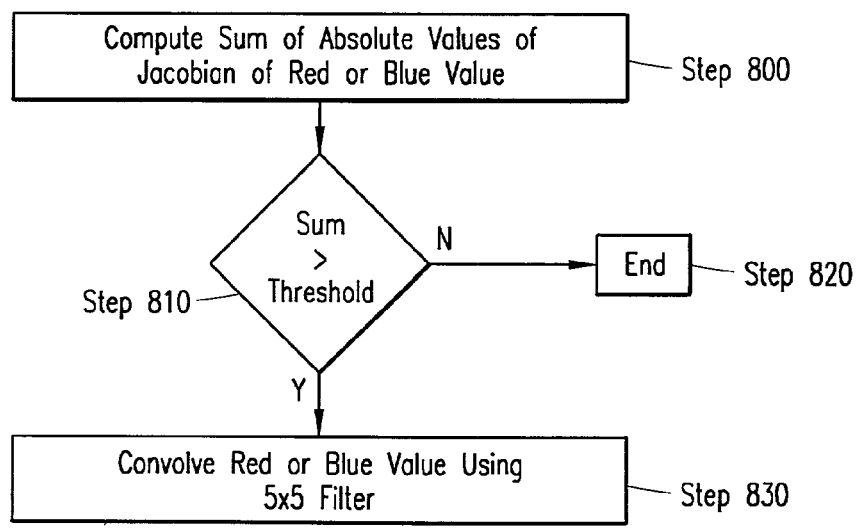
FIG. 8 is a flow chart illustrating the exemplary steps of an enhancement to the demosaicing algorithm of the present invention that reduces noise in an image.

Another enhancement to the PVM demosaicing algorithm is shown in FIG. 8. FIG. 8 illustrates the steps for reducing noise in an image. The type of adaptive smoothing proposed above for G1:G2 compensation can be easily extended to the red and blue pixels, for the purpose of noise reduction. The adaptive smoothing for noise reduction applies a smoothing filter to the raw red and blue values at pixels that do not lie on edges, and uses the smoothed red and blue values for interpolation. As described above in connection with FIG. 6, whether a pixel lies on an edge may be determined by computing the sum of absolute values of entries from the Jacobian matrix shown in Equation 6 (step 800). If the sum of the absolute values of entries in the Jacobian is less than a predefined threshold (step 810), the pixel does not lie on an edge, and hence smoothing may be applied to the raw red or blue value. If the sum is not less than the predefined threshold (step 810), the pixel does lie on an edge and processing ends (step 820). The 5×5 smoothing filter for noise reduction is as follows (step 830):

$$\frac{1}{16}\begin{bmatrix} 1 & 0 & 1 & 0 & 1 \\ 0 & 0 & 0 & 0 & 0 \\ 1 & 0 & 8 & 0 & 1 \\ 0 & 0 & 0 & 0 & 0 \\ 1 & 0 & 1 & 0 & 1 \end{bmatrix}.$$ (Equation 22)

Adaptive smoothing using the above filter for red and blue pixel values has the advantage of reducing noise without blurring edges.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A method for determining whether a pixel lies on an edge of a digital image, said method comprising:

determining, for said pixel, a first edge-orientation of a first color and a second edge-orientation of a second color, said first and second edge-orientations each having a row component and a column component; and providing respective interpolation votes associated with said first edge-orientation and said second edge-orientation based on said respective row components and said respective column components to determine a selected interpolation orientation, said respective interpolation votes being either a first interpolation orientation or a second interpolation orientation, said selected interpolation orientation being based on the number of said interpolation votes for said first interpolation orientation and said second interpolation orientation.

2. The method of claim 1, wherein said first and second edge-orientations are first and second gradients, said first and second gradients forming a Jacobian of said pixel.

3. The method of claim 2, wherein said first interpolation orientation is a horizontal interpolation and said second interpolation orientation is a vertical interpolation, and wherein said step of providing further comprises:

setting a first one of said interpolation votes associated with said first gradient, said first interpolation vote being set as said horizontal interpolation when the absolute value of a row component of said first gradient is lower than the absolute value of a column component of said first gradient, said first interpolation vote being set as said vertical interpolation when the absolute value of said column component of said first gradient is lower than the absolute value of said row component of said first gradient;

setting a second one of said interpolation votes associated with said second gradient, said second interpolation vote being set as said horizontal interpolation when the absolute value of a row component of said second gradient is lower than the absolute value of a column component of said second gradient, said second interpolation vote being set as said vertical interpolation when the absolute value of said column component of said second gradient is lower than the absolute value of said row component of said second gradient; and selecting either said horizontal interpolation, said vertical interpolation or a combination of said vertical interpolation and said horizontal interpolation for said selected interpolation orientation based on said steps of setting.

4. The method of claim 3, wherein said step of selecting further comprises:

providing neighborhood vote data, said neighborhood vote data including a majority vote from at least one adjacent pixel, said majority vote being horizontal interpolation when the majority of said interpolation votes from said adjacent pixel are horizontal interpolation and vertical interpolation when the majority of said interpolation votes from said adjacent pixel are vertical interpolation; and adding said neighborhood vote data to said interpolation votes to determine said selected interpolation orientation.

5. The method of claim 4, wherein said step of selecting further comprises:

setting at least a first threshold and a second threshold associated with the number of said interpolation votes for either said horizontal interpolation or said vertical interpolation; and selecting said combination of said vertical and horizontal interpolations as said selected interpolation orientation when the number of said interpolation votes for either said horizontal interpolation or said vertical interpolation falls in between said first and second thresholds.

6. A method for demosaicing a digital image represented as values at pixel locations, said method comprising:

receiving a set of first color values and a set of second color values;

determining for a given one of said first color values associated with a given one of said pixel locations a first degree of change using said set of first color values and a second degree of change using said set of second color values, said first and second degrees of change each having a row component and a column component;

comparing said row component to said column component for both said first and second degrees of change to determine a selected interpolation orientation.

7. The method of claim 6, further comprising:

interpolating a missing second color value associated with said given pixel location using said selected interpolation orientation.

8. The method of claim 7, wherein said step of interpolating further comprises:

interpolating said missing second color value by applying a linear prediction function that uses said first color values and said second color values.

9. The method of claim 8, wherein said step of interpolating further comprises:

determining a number of said first and second color values that are below a low-light threshold value; and turning off said linear prediction function when said number exceeds an additional threshold value.

10. The method of claim 7, further comprising:

determining a difference value by subtracting said interpolated missing second color value from said given first color value; and interpolating a missing first color value using at least said difference value, said missing first color value being associated with one of said pixel locations that did not produce said first color value.

11. The method of claim 6, wherein said first and second degrees of change are first and second gradients, respectively, said first and second gradients forming a Jacobian of said given first color value, and wherein said step of comparing further comprises:
  supplying, by each of said first and second gradients, a respective interpolation vote, said interpolation vote being either a first interpolation orientation or a second interpolation orientation, said selected interpolation orientation being based on the number of said interpolation votes for said first interpolation orientation and said second interpolation orientation.

12. The method of claim 11, wherein said first interpolation orientation is a horizontal interpolation and said second interpolation orientation is a vertical interpolation, and wherein said step of supplying further comprises:
  setting said interpolation vote as said horizontal interpolation, by a respective one of said first and second gradients, when the absolute value of said row component of said respective gradient is lower than the absolute value of said column component of said respective gradient;
  setting said interpolation vote as said vertical interpolation, by said respective gradient, when the absolute value of said column component of said respective gradient is lower than the absolute value of said row component of said respective gradient; and
  selecting either said horizontal interpolation, said vertical interpolation or a combination of said vertical interpolation and said horizontal interpolation for said selected interpolation orientation based on said steps of setting.

13. The method of claim 12, wherein said step of selecting further comprises:
  providing neighborhood vote data, said neighborhood vote data including a majority vote from at least one adjacent one of said pixel locations to said given pixel location, said majority vote being horizontal interpolation when the majority of said interpolation votes from said adjacent one of said pixel locations are horizontal interpolation and vertical interpolation when the majority of said interpolation votes from said adjacent one of said pixel locations are vertical interpolation; and
  adding said neighborhood vote data to said interpolation votes to determine said selected interpolation orientation.

14. The method of claim 13, wherein said step of selecting further comprises:
  setting at least a first threshold and a second threshold associated with the number of said interpolation votes for either said horizontal interpolation or said vertical interpolation; and
  selecting said combination of said vertical and horizontal interpolations as said selected interpolation orientation when the number of said interpolation votes for either said horizontal interpolation or said vertical interpolation falls in between said first and second thresholds.

15. The method of claim 6, wherein said first color values are chrominance color values and said second color values are luminance color values.

16. The method of claim 15, further comprising:
  determining a first mean luminance value of a first group of said luminance color values and a second mean luminance value of a second group of said luminance color values;
  determining a difference percentage between said first mean luminance value and said second mean luminance value; and
  increasing said luminance color values of said first group by said difference percentage when said first mean luminance value is lower than said second mean luminance value.

17. The method of claim 15, further comprising:
  determining a Jacobian of a given one of said luminance color values from said set of luminance color values;
  determining a first sum of the absolute values of the values within said Jacobian; and
  if said first sum is less than a predefined threshold:
    multiplying said given luminance color value by four,
    adding said luminance color values of four diagonally adjacent pixel locations to obtain a second sum, and
    dividing said second sum by eight.

18. The method of claim 6, further comprising:
  determining a Jacobian of said given first color value;
  determining a first sum of the absolute values of the values within said Jacobian; and
  if said first sum is less than a predefined threshold:
    multiplying said given first color value by eight,
    adding said first color values of eight nearest pixel locations to obtain a second sum, and
    dividing said second sum by sixteen.

19. A digital image system for demosaicing a digital image represented as values at pixel locations, said system comprising:
  a processor adapted to receive a set of first color values and a set of second color values, said processor being further adapted to determine for a given one of said first color values associated with a given one of said pixel locations a first degree of change using said first set of colors and a second degree of change using said set of second color values, said first and second degrees of change each having a row component and a column component, said row component being compared to said column component for both said first and second degrees of change to determine a selected interpolation orientation.

20. The system of claim 19, wherein said processor is further adapted to interpolate a missing second color value associated with said given pixel location using said selected interpolation orientation.

21. The system of claim 20, wherein said processor is further adapted to interpolate said missing second color value by applying a linear prediction function that uses said first color values and said second color values.

22. The system of claim 21, wherein said processor is further adapted to determine a number of said first and second color values that are below a low-light threshold value, said processor being further adapted to turn off said linear prediction function when said number exceeds an additional threshold value.

23. The system of claim 20, wherein said processor is further adapted to receive a set of third color values, said sets of first, second and third color values each being associated with a different color, said processor being capable of determining a third degree of change associated with said third color values.

24. The system of claim 23, wherein said processor is further adapted to determine a difference value by subtracting said interpolated missing second color value from said given first color value and interpolate a missing first color associated with said second or third color values using at least said difference value.

25. The system of claim 23, wherein said first, second and third degrees of change are first, second and third gradients, respectively, said first, second and third gradients forming a Jacobian of said given first color value, each of said first, second and third gradients supplying a respective interpolation vote, said interpolation vote being either a first interpolation orientation or a second interpolation orientation, said selected interpolation orientation being based on the number of said interpolation votes for said first interpolation orientation and said second interpolation orientation.

26. The system of claim 25, wherein said first interpolation orientation is a horizontal interpolation using at least one or more of said second color values from said pixel locations within the same row of said pixel locations as said given pixel location and said second interpolation orientation is a vertical interpolation using at least one or more of said second color values from said pixel locations within the same column of said pixel locations as said given pixel location, said interpolation vote of a respective one of said first, second and third gradients being said horizontal interpolation when the absolute value of said row component of said respective gradient is lower than the absolute value of said column component of said respective gradient and vertical interpolation when the absolute value of said column component of said respective gradient is lower than the absolute value of said row component of said respective gradient, said selected interpolation orientation being selected from the group consisting of: said horizontal interpolation, said vertical interpolation or a combination of said vertical interpolation and said horizontal interpolation.

27. The system of claim 26, further comprising:
a memory capable of storing neighborhood vote data, said neighborhood vote data including a majority vote from at least one adjacent one of said pixel locations to said given pixel location, said majority vote being horizontal interpolation when the majority of said interpolation votes from said adjacent one of said pixel locations are horizontal interpolation and vertical interpolation when the majority of said interpolation votes from said adjacent one of said pixel locations are vertical interpolation, said neighborhood vote data being added to said interpolation votes to determine said selected interpolation orientation.

28. The system of claim 27, further comprising:
at least a first threshold and a second threshold associated with the number of said interpolation votes for either said horizontal interpolation or said vertical interpolation, said selected interpolation orientation being said combination of said vertical and horizontal interpolations when the number of said interpolation votes for either said horizontal interpolation or said vertical interpolation falls in between said first and second thresholds.

29. The system of claim 19, wherein said first color values are chrominance color values and said second color values are luminance color values.

30. The system of claim 29, wherein said processor is further adapted to determine a first mean Luminance value of a first group of said luminance color values and a second mean luminance value of a second group of said luminance color values, said processor further being adapted to determine a difference percentage between said first mean luminance value and said second mean luminance value and increase said luminance color values of said first group by said difference percentage when said first mean luminance value is lower than said second mean luminance value.

31. The system of claim 29, wherein said processor is further adapted to determine a Jacobian of a given one of said luminance color values from said set of luminance color values and determine a first sum of the absolute values of the values within said Jacobian, said processor being further adapted to multiply said given luminance color value by four, add said luminance color values of four diagonally adjacent pixel locations to obtain a second sum and divide said second sum by eight when said first sum is less than a predefined threshold.

32. The system of claim 19, wherein said processor is further adapted to determine a Laplacian of a select color value within either said set of first color values or said set of second color values and add said Laplacian multiplied by an adjustable parameter to said select color value.

33. The system of claim 19, wherein said processor is further adapted to determine a Jacobian of said given first color value and determine a first sum of the absolute values of the values within said Jacobian, said processor being further adapted to multiply said given first color value by eight, add said first color values of eight nearest pixel locations to obtain a second sum and divide said second sum by sixteen when said first sum is less than a predefined threshold.

* * * * *